United States Patent [19]
Loomis

[11] Patent Number: 5,495,257
[45] Date of Patent: Feb. 27, 1996

[54] INVERSE DIFFERENTIAL CORRECTIONS FOR SATPS MOBILE STATIONS

[75] Inventor: Peter V. W. Loomis, Sunnyvale, Calif.

[73] Assignee: Trimble Navigation Limited, Sunnyvale, Calif.

[21] Appl. No.: 277,149

[22] Filed: Jul. 19, 1994

[51] Int. Cl.$^6$ .......................................................... G01S 5/02
[52] U.S. Cl. ................................. 342/357; 364/449
[58] Field of Search ...................................... 342/357, 352; 364/449

[56] References Cited

U.S. PATENT DOCUMENTS

| | | | |
|---|---|---|---|
| 4,578,678 | 3/1986 | Hurd | 342/357 |
| 4,894,662 | 1/1990 | Counselman | 342/357 |
| 4,972,431 | 11/1990 | Keegan | 375/1 |
| 5,148,179 | 9/1992 | Allison | 342/357 |

*Primary Examiner*—Thomas H. Tarcza
*Assistant Examiner*—Dao L. Phan
*Attorney, Agent, or Firm*—John Schipper

[57] ABSTRACT

A method for enhancing the accuracy of location coordinates and/or clock bias computed for a mobile user station that is part of a Satellite Positioning System (SATPS), such as GPS or GLONASS. A reference SATPS station is provided with known location coordinates, and pseudoranges $PR(t)$ and pseudorange corrections $\Delta PR(t)$ for the reference station are computed as in a conventional differential GPS approach. A matrix equation $H(t) \Delta W(t) = \Delta PR(t)$ relates the corrections for the spatial location coordinates and clock bias at the mobile station (or at the reference station) to the pseudorange correction values at that station, where H is an M×N matrix (M≦N; N=3 or 4) with known entries. Each of the N rows of the matrix H has M entries and forms a row vector, and these row vectors are linearly independent in an M-dimensional vector space. These row vectors span an N-dimensional vector space. The matrix H is augmented by M–N rows representing independent vectors in an M-dimensional vector space, to produce an augmented M×M matrix H*, for which an inverse $H^*(t)^{-1}$ exists. An augmented matrix equation $\Delta W^*(t;\text{mobile}) = H^*(t)^{-1} \Delta PR(t)$ is formed, and N of the entries in the M×1 matrix $\Delta W^*(t)$ are interpreted as corrections for the spatial location coordinates and/or clock bias for the mobile station. In another embodiment, an M×1 projected vector v is formed from all the uncorrected pseudorange components for the mobile station and a reduced set of these components are transmitted to the reference station. The full vector v is then reconstructed from this reduced set and used to reconstruct the mobile station uncorrected pseudorange values. Corrected mobile station pseudorange values are computed and used to determine the spatial location and clock bias coordinates for the mobile station.

13 Claims, 4 Drawing Sheets

INVERSE DIFFERENTIAL CORRECTIONS FOR SATPS MOBILE STATIONS

FIELD OF THE INVENTION

This invention relates to enhancement of the accuracy of spatial location coordinates and clock bias provided by a Satellite Positioning System, such as GPS or GLONASS.

BACKGROUND OF THE INVENTION

Development of Satellite Positioning Systems (SATPSs), such as the Global Positioning System (GPS) in the United States and the Global Orbiting Navigational System (GLONASS) in the former Soviet Union, has allowed location coordinates of an object on or near the Earth to be determined with improved accuracy. Under ordinary circumstances, these location coordinates can be determined with an inaccuracy of no more than 30 meters. In order to further improve the accuracy provided by SATPS location determination, differential GPS (DGPS), and more generally differential SATPS (DSATPS), has been introduced and used. A DSATPS can provide locations with inaccuracies as low as a few meters, or lower in some instances. Implementation of a DSATPS requires that an SATPS reference station, whose location coordinates are known with high accuracy (to within a fraction of a meter) be provided to receive the normal SATPS signals from an SATPS satellite. The reference station compares its known pseudorange, based on its known location and known satellite and clock biases, with the pseudorange computed using the acceptable SATPS signals received from each visible satellite. The difference, called a pseudorange correction, between the known pseudorange and the computed pseudorange is transmitted for each such SATPS satellite, along with an indicium that identifies that satellite. A mobile SATPS station within 100–200 kilometers (km) of the reference station receives and uses these pseudorange corrections to correct its own SATPS-determined pseudorange values for each acceptable satellite signal. The pseudorange corrections must be received and processed at the mobile station.

Several problems are presented here. First, this process assumes that the pseudorange corrections, determined at the SATPS reference station, are also valid at the mobile SATPS station, which may be spaced apart from the reference station by as much as 200 km. This assumption may be unjustified if the local ionosphere and/or the local troposphere is undergoing relatively rapid change with time, or if the multipath signals that contribute to the pseudoranges at the two stations are substantially different.

Second, this process requires that the pseudorange corrections always be transmitted to and used at the mobile SATPS station. In some situations, it may be more convenient to transmit the mobile station pseudorange information to the reference station and to allow the reference station to do the processing and subsequent analysis.

Third, the variables actually determined are not the pseudoranges but the locations themselves. A single central station and associated GPS reference station may service a large number of mobile users, each with a different location in the field. The pseudorange corrections for each user varies with the user's actual location in the field. In a tracking application, for example, the GPS-determined location of a mobile user is determined and transmitted to a central station for accumulating a time history of the user's location and for subsequent analysis, using the corrections determined by a GPS reference station at or near the central station. In a mapping application, a sequence of GPS-determined locations is computed and stored in a file in a mobile user's GPS receiver/processor. This file is stored at the central station, to use the corrections determined by a GPS reference station at or near the central station and to develop a corrected set of locations for sites that were earlier mapped by the user.

Although measurements and use of pseudoranges are fundamental to SATPS-assisted determination of location and/or time coordinates, only a few patents disclose procedures that work directly with the pseudorange values. In U.S. Pat. No. 4,578,678, Hurd discloses a GPS receiver that receives a plurality of pseudorange signals, compares these signals with replicas of the expected pseudorange signals, using a correlation technique, and determines the associated time delay, frequency and other variables of interest for these signals to determine receiver location, velocity, clock offset and clock rate.

Keegan discloses a P-code receiver/processor: in U.S. Pat. No. 4,972,431, that analyzes pseudorange and phase for encrypted GPS signals by squaring and filtering the incoming signals. Weaker signals can be analyzed using this technique.

A multi-antenna system for GPS signals that determines time biases in the carrier frequencies from time averaging in simultaneous pseudorange measurements is disclosed by Counselman in U.S. Pat. No. 4,809,005. GPS antennas are placed on a seismic survey vessel and on a towed vessel to sense and compensate for false signals received by the seismic vessel antenna(s), and present location of the survey vessel is determined. Similar techniques are disclosed by Counselman, in U.S. Pat. No. 4,894,662, for determining present location using only C/A signals transmitted by the satellites.

Allison, in U.S. Pat. No. 5,148,179, discloses a method for using double differences of pseudorange and carrier phase measurements. The technique uses double differences formed from signals received from four satellites by two different receivers to eliminate certain bias and atmospheric perturbation terms.

A GPS receiver that uses conventional pseudorange and carrier phase measurements to provide a directional indicator, such as a compass, is disclosed in U.S. Pat. No. 5,266,958, issued to Durboraw. A single antenna is moved in a closed path, and differences between predicted and actual carrier phases are used to determine location perturbations, which are then resolved into components parallel and perpendicular to a desired path heading in a given plane.

These patents measure pseudoranges, usually at a single station, and apply complex analysis to determine as much as possible from these single-station measurements. Where differential GPS or SATPS pseudorange corrections are sought, a procedure must be found to allow consistent sharing of these corrections and to provide consistent determination of the corresponding location coordinate and clock bias corrections for a reference station and one or more mobile stations that communicate with the reference station.

What is needed is a method and apparatus for converting a mobile user's uncorrected SATPS-determined location in the field to the equivalent uncorrected pseudoranges at the user's location, applying the pseudorange corrections appropriate for the user's location, and determining the user's corrected location coordinates. The pseudorange corrections should be based on the mobile user's present location, not on the location of a reference station used for initially determining these corrections. Preferably, this method should be implementable by modest changes made to the existing SATPS location determination software and with no changes in the associated hardware at the reference station or carried by the mobile user. Preferably, this method should require only one-way transmission of data for pseudorange corrections, and the amount of data transmitted should be minimized.

SUMMARY OF THE INVENTION

These needs are met by the invention, which provides a method for converting uncorrected SATPS-determined location coordinates at the mobile station location into location coordinates that are corrected for pseudorange differences, based on observations of these differences at the reference station. In a first embodiment of the method, SATPS signals from the same M SATPS satellites (M≧4) are received at each of an SATPS mobile station and an SATPS reference station, and the satellite pseudoranges and location and time coordinates for that station are determined. The satellite pseudorange corrections and other observable errors are represented by an M×1 column matrix $\Delta PR(t)=PR(t)-PR(t)_0$, where the entries of the matrix $PR(t)_0$ represent the correct pseudorange signals for a nominal solution of an assembly of such signals received at a known location on or near the Earth's surface. The pseudorange corrections matrix $\Delta PR(t)$ is related to a 4×1 matrix $\Delta W(t)$ of location coordinates and clock bias corrections by a matrix equation $\Delta PR(t)=H(t) \Delta W(t)$, where $H(t)$ is an M×4 matrix whose coefficients are determined from the known vectors that extend from the nominal solution location to the present locations of the M satellites. This matrix equation applies at the reference station and at a mobile station.

The pseudorange corrections for the reference station $\Delta PR(t)$ are computed, using the known location and clock bias coordinates of the reference station, as in conventional differential SATPS corrections. The four column vectors of the H matrix span a four-dimensional subspace $S_H$ of an M-dimensional space $S_{H*}$, and the matrix H is augmented to become an M×M matrix $H^*$ in the space $S_{H*}$. If M=4, the augmented matrix $H^*=H$ and $S_{H*}=S_H$. If M≧5 (the normal situation), the space $S_H$ is a proper subset of the space $S_{H*}$. This extends to a situation with M≧3, using two spatial location coordinates and clock bias, or using three spatial location coordinates.

The matrix $H^*$ is invertible, and the matrix $(H^*)^{-1}$ is determined at the reference station. The spatial location/time coordinate matrix $\Delta W(t)$ is augmented to become an M×1 column matrix in the space $S_{H*}$. The uncorrected spatial location and clock bias coordinates W(t;mobile) for the mobile station are transmitted to the reference station, and the correction matrix $\Delta W^*(t)=H^*(t)^{-1}\Delta PR(t)$ is constructed from this information for the mobile station location and clock bias. The uncorrected pseudorange values for the mobile station are combined with the pseudorange corrections for the reference station to determine the corrected pseudorange values and corrected spatial location and clock bias coordinates for the mobile station.

This approach provides at least two major benefits. First, this approach requires only one-way transmission of as few as four coordinate values, and these coordinate values are usually limited to a few hundred kilometers or less. Thus, relatively few bits (as few as 16 per coordinate) are required for such transmission of the coordinate information. Second, this approach uses the (uncorrected) mobile station location coordinates, with an estimated initial inaccuracy of no more than 30 meters, to determine the pseudorange corrections, rather than using the location coordinates of the reference station, which can be displaced from the mobile station by as much as a few hundred kilometers.

DESCRIPTION OF BEST MODE OF THE INVENTION

Figure 1:
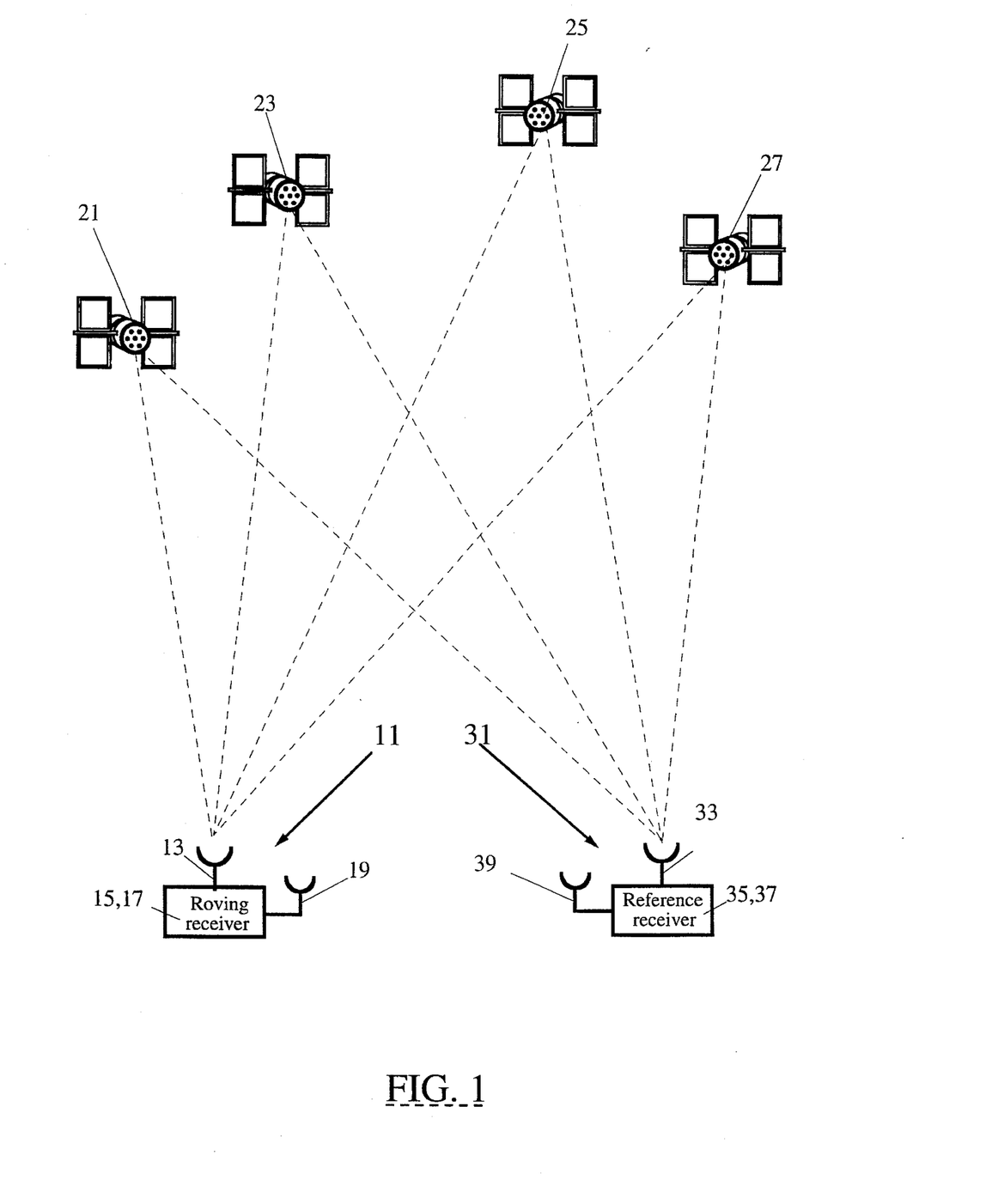
FIG. 1 is a schematic view of an environment in which the invention can be used.

An SATPS mobile station 11 carries an SATPS signal antenna 13 and associated SATPS signal receiver/processor 15 and a mobile station transmitter 17 and associated antenna 19 that are connected to the SATPS receiver/processor 15, in one embodiment of the invention shown in FIG. 1. The mobile station 11 receives SATPS signals from M (≧4) SATPS satellites 21, 23, 25 and 27. Receipt of these signals allows the user to calculate the uncorrected, SATPS-determined present location and clock bias or location fix coordinates $(x,y,z,b)_{unc}$ of the SATPS antenna 13 in a selected coordinate system. The spatial location coordinates (x,y,z) may be expressed in any coordinate system and are not limited to a Cartesian system. The mobile station transmitter 17 and antenna 19 transmit the uncorrected coordinates $(x,y,z,b)_{unc}$ to a GPS reference station 31 that is spaced apart from the mobile station 11. The location coordinates of the SATPS reference station 31 are known with high accuracy, through a survey or by other means.

The reference station 31 also has an SATPS signal antenna 33 and SATPS signal receiver/processor 35 that receives and processes SATPS signals from the M SATPS satellites 21, 23, 25 and 27. The reference station 31 can determine the pseudorange corrections PRC(t;i=31;j) for its own (known) location and time of measurement, using the SATPS signals received from these four satellites (j=1, 2, 3, 4 or j1, j2, j3, j4). The reference station 31 also includes a radiowave receiver 37 and associated antenna 39 that receive signals transmitted by the mobile station transmitter 17 and antenna 19.

In one approach to determination of the location coordinates for an SATPS station, a nominal solution with known spatial location coordinates (x0,y0,z0) is determined in some neighborhood of a location of interest (preferably within 100 km) with as yet unknown location coordinates (x,y,z), where the nominal solution precisely satisfies the pseudorange relations $$[(x0-x_j(t))^2+(y0-y_j(t))^2+(z0-z_j(t))^2]^{1/2}+b0=PR(t;j;0), \qquad (1)$$

Here PR(t;j;0) is the pseudorange measured from SATPS satellite number j (j= 1, 2, . . . , N), which has known, time varying spatial coordinates $(x_j(t),y_j(t),z_j(t))$, to the nominal spatial location with coordinates (x0,y0,z0) at a time t. Here, b0 is the known clock bias for the nominal solution. The formalism used here is set forth by P. S. Jorgensen in "Navstar/Global Positioning System 18-satellite Constellations," Navigation, vol. 2, 1984, pp. 1–12, Appendix B.

For a location of interest, such as the unknown present spatial location and clock bias (x,y,z,b) of an SATPS station, a similar equation applies, viz.

$$[(x-x_j(t))^2+(y-y_j(t))^2+(z-z_j(t))^2]^{1/2}+b=PR(t;j;S), \qquad (2)$$

where "S" refers to the spatial location of interest and $j=1, 2, \ldots, M$ for the M different satellites in view from that location. It is assumed that $|x-x0| \ll |x0-x_j(t)|$, $|y-y0| \ll |y0-y_j(t)|$ and $|z-z0| \ll |z0-z_j(t)|$. The distances $|x-x0|$, $|y-y0|$ and $|z-z0|$ are usually no larger than a few hundred km and can be made much less by choice of a nominal solution point $(x0,y0,z0)$ in a neighborhood of the SATPS station. The distances $|x0-x_j(t)|$, $|y0-y_j(t)|$ and $|z0-z_j(t)|$ are usually $\geq 22,000$ km, by contrast. Equation (2) is rewritten in the form $$[(x-x0+x0-x_j(t))^2+(y-y0+y0-y_j(t))^2+(z-z0+z0-z_j(t))^2]^{1/2}+b0+(b-b0)=PR(t;0;j)+\Delta PR(t;0;j), \quad (3)$$

$$\Delta PR(t;0;j)=PR(t;S;j)-PR(t;0;j), \quad (4)$$

a Taylor series expansion is carried out in Eq. (3), with the differential quantities being the variables $\Delta x=x-x0$, $\Delta y=y-y0$, $\Delta z=z-z0$ and $\Delta b=b-b0$, and all terms of degree higher than one in the differential quantities are initially ignored. The collection of lowest order terms in this resulting relation satisfies Eq. (1) so that after cancellation of these terms the resulting approximation to Eq. (3) for the M different satellites becomes expressible in matrix form as $$H(t)\Delta W(t)=\Delta PR(t), \quad (5)$$

$$H(t)=(h_{ji}(t)), \quad (6)$$

$$h_{j1}(t)=\alpha_{j1}(t)=(x0-x_j(t))/r_{0j}, \quad (7)$$

$$h_{j2}(t)=\alpha_{j2}(t)=(y0-y_j(t))/r_{0j}, \quad (8)$$

$$h_{j3}(t)=\alpha_{j3}(t)=(z0-z_j(t))/r_{0j}, \quad (9)$$

$$h_{j4}(t)=1 \, (j=1,2,\ldots,M), \quad (10)$$

$$r_{0j}(t)=[(x0-x_j(t))^2+(y0-y_j(t))^2+(z0-z_j(t))^2]^{1/2}, \quad (11)$$

$$\Delta W(t)^{tr}=W(t)^{tr}-W0^{tr}=[\Delta x \, \Delta y \, \Delta z \, \Delta b], \quad (12)$$

$$\Delta PR(t)^{tr}=[\Delta PR(t;0;1)\Delta PR(t;0;2) \ldots \Delta PR(t;0;M)]. \quad (13)$$

Equation (5) relates the spatial and clock bias corrections $(\Delta x,\Delta y,\Delta z,\Delta b)$ (to be determined; referred to collectively here as the "coordinate corrections") to measurable or determinable differences in pseudorange parameters $\Delta PR(t;0;j)$ for the M satellites, and each of the entries $h_{ji}(t)$ ($i=1, 2, 3$) in this first transformation matrix $H(t)$ depends upon the direction cosines $\alpha_{ji}(t)$ of the vector extending from the nominal solution location to the present location of each of the M satellites and can be computed from a knowledge of the ephemerides of the M in-view satellites. Equation (5) applies to the reference station and to a mobile station near the reference station. The M×4 matrix $H(t)$ relates the pseudorange corrections $\Delta PR(t;0;j)$ to the coordinate corrections $(\Delta x,\Delta y,\Delta z,\Delta b)$ relative to the nominal solution corrections. This matrix H is obtained from a first order expansion of the actual solution about the known solution and, therefore, provides approximate coordinate corrections. Other formalisms can be used here, but the form obtained for the resulting linearized relations is that of Eq. (5).

The mobile station uncorrected coordinate values $W(t)_{unc}^{tr}=[x \, y \, z \, b]_{unc}^{tr}$ are computed at the mobile station 11 and are transmitted by the mobile station's transmitter 17 and antenna 19 to the receiver 37 and antenna 39 at the reference station 31. The values transmitted are chosen for efficiency, not ease of computation. The spatial location coordinates of the mobile station 11 have modest dynamic ranges, such as a few hundred meters, because the spatial location changes relatively slowly, if at all. The clock bias coordinate also has a limited dynamic range. Further, the total number (four) of these coordinate values $W(t)$ is manageable and can be stored in a memory as four double precision numerical values. If, on the other hand, the pseudorange values are to be transmitted to the reference station, the possible dynamic ranges are much larger; specification of the time coordinate requires sub-millisecond accuracy; and full range transmission of the pseudorange values would probably require 4M double precision coordinate values for the satellites. Thus, 8 bytes are required for transmission of the four coordinate values, and 4M bytes would be required for transmission of the pseudorange values, with $M \geq 4$. Transmission of the index number (for example, 1–24) of each of the M SATPS satellites signals whose pseudorange measurements are used to determine the (uncorrected) location coordinates adds approximately 5M/8 bytes, whether the pseudoranges or the location coordinates are transmitted. Thus, the number of bytes required for transmission of the necessary mobile station information to the reference station is approximately 8+5M/8 bytes, if location coordinates are sent, and is approximately 4.625M bytes, if pseudorange values are sent; for example, if M=6, these numbers become roughly 12 bytes and 27 bytes, respectively. Thus, the savings in number of bytes transmitted is substantial.

The matrix $H(t)$ can be computed using the spatial location coordinates for the reference station itself. Use of these coordinates to compute the matrix $H=H(t;\text{reference})$ offers the advantage that the reference station coordinates are known very accurately. Alternatively and preferably, the uncorrected spatial location coordinates $(x,y,z)_{unc}$ received from the mobile station can be used to compute the matrix H, written as $H(t;\text{mobile})$. Although these uncorrected coordinate values have inherent inaccuracies, these inaccuracies are likely to be relatively small (under 30 meters) and the entries for the matrix $H(t;\text{mobile})$ are close to what should be used in Eq. (5) to relate the pseudorange corrections to the location corrections at the mobile station.

The entries for the uncorrected coordinate matrix $W(t)_{unc}^{tr}=[x \, y \, z \, b]_{unc}^{tr}$, determined from uncorrected pseudorange measurements on the M satellites made by the mobile station 11, are received at the reference station 31 and must be reconverted to uncorrected pseudorange values $PR(t;\text{user};j)_{unc}$ for the user location for each of the satellites $j=1, 2, \ldots, M$ and then corrected. Initially, a four-dimensional vector space $S_H$ is spanned by the M rows of the M×4 matrix H, with each row having four entries. Each of the M ordered rows of entries in H is also a vector in an expanded M-dimensional vector space $S_{H*}$. The four-vector $W(t)$ is extended to an M-vector $W^*$ that includes the original four-dimensional vectors that span the vector space $S_H$.

The space $S_{H*}$ is spanned by the vectors in the space $S_H$ and by M−4 additional, linearly independent vectors in $S_{H*}$. If M=4, $S_{H*}=S_H$, as noted above. These M−4 additional, linearly independent vectors can be found by the Gram-Schmidt orthogonalization process applied to the four M-entry column vectors of the H matrix, or by any other suitable process for vector space augmentation. The Gram-Schmidt orthogonalization process is discussed in R. Courant and D. Hilbert, *Methods of Mathematical Physics*, Interscience Publishers, New York, 1937, vol. 1, pp. 50–51.

By this process, the matrix $H(t)$ becomes an augmented M×M matrix $H^*(t)$ in the space $S_{H*}$, with non-zero determinant. The matrix $H^*(t)$, therefore, has an inverse $(H^*(t))^{-1}$ in the space $S_{H*}$, and one can set down an inverted form of Eq. (1) as $$\Delta W^*(t)=H^*(t)^{-1}\Delta PR(t), \quad (14)$$

where $\Delta W^*(t)$ is an M-dimensional extension of the four-vector $\Delta W(t)$ in the extended space $S_{H*}$. Equation (14) is used at the reference station 31 to recover the coordinate value corrections $\Delta W^*(t)$ that would be computed at the mobile station's location, if the pseudorange corrections were available at that station. The mobile station uncorrected coordinate values are then corrected by application of the pseudorange corrections, computed at the reference station 31. The corrected pseudorange values for the mobile station 11 are then used to determine the corrected spatial location coordinates and clock bias (x,y,z,b) of the mobile station according to the equation $$W^*(t)=W^*(t)_{unc}+H^*(t)^{-1}\Delta PR(t), \quad (15)$$

where $W^*(t)_{unc}=[x\ y\ z\ b\ -\ldots-]_{unc}$ is an M×1 matrix whose last M–4 entries may have any values, because their effects are ignored. The matrix $W^*(t)$ contains the corrected coordinates $(x, y, z, b)_{cor}$ for the mobile station, together with other entries.

Four of the entries in the coordinate value corrections matrix $\Delta W^*(t)$ correspond to, and are interpretable as, corrections for the respective four coordinates x, y, z and b for the matrix W(t). In a preferred embodiment, these four entries are the first four entries of the matrix $\Delta W^*(t)$, and the first four entries of the M×1 matrix $W^*(t)$ in Eq. (15) become the corrected coordinate values x, y, z and b. The reference station and the mobile station must agree on a format for these entries, and the mobile station must transmit its uncorrected location coordinates and clock bias measurements in an agreed order, such as x, y, z, b, or some other order. It is preferable, but not necessary, that all mobile stations transmit their uncorrected coordinate measurements (location coordinates and clock bias) in the same order. Alternatively, the four entries of the matrix $\Delta W^*(t)$ that correspond to the location coordinates and clock bias corrections can be taken to be the last four entries, or any other choice of four different entry positions in the matrix $\Delta W^*(t)$, as long as the mobile station and the reference station agree on these four positions and on the order.

Figure 2:
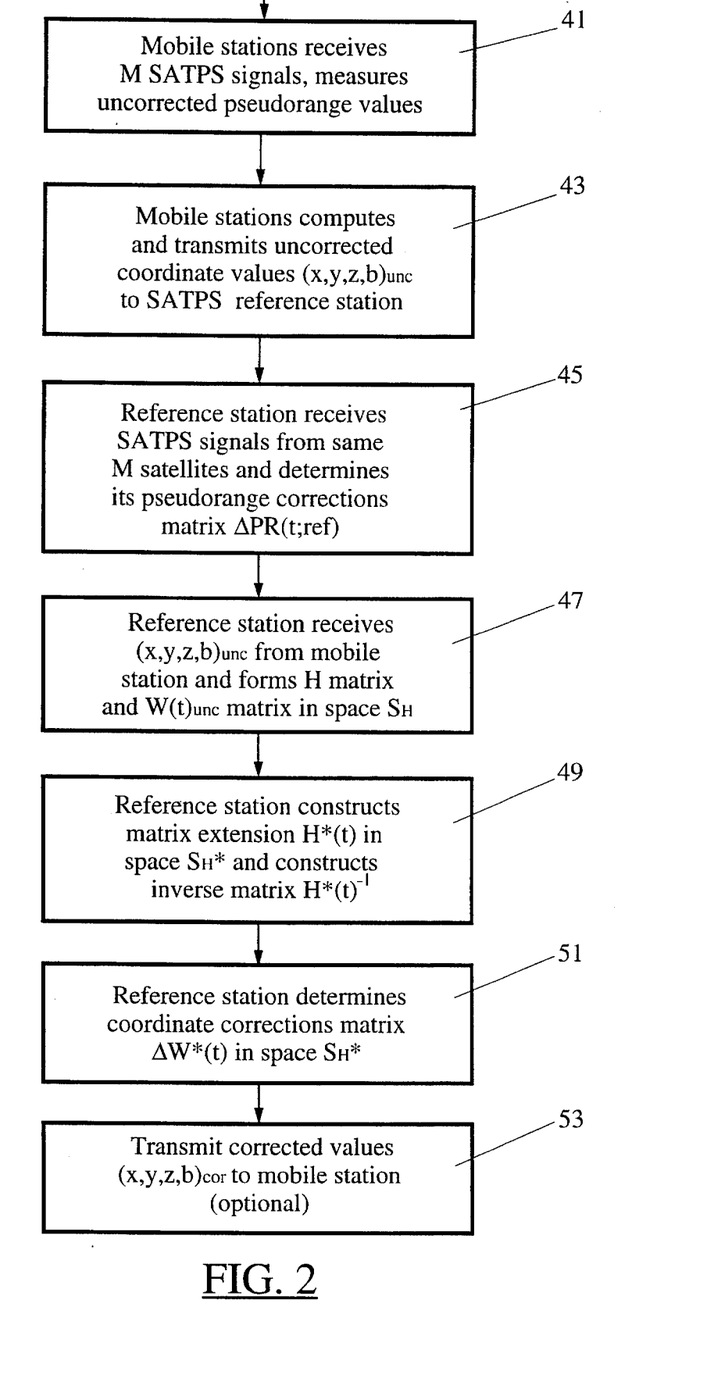
FIGS. 2, 3 and 4 are flow diagrams illustrating use of the invention in various embodiments.

In what order should the entries in the pseudorange corrections matrix $\Delta PR(t)$ be arranged in Eqs. (14) or (15)? Recall that each entry in the matrix $\Delta PR(t)$ corresponds to a different satellite. One suitable order, which must be agreed upon by the mobile station and the reference station, is to arrange the "fundamental set" of satellites (the "best" minimum set, usually four, needed to determine DSATPS corrections for the reference station, or for the mobile station) in decreasing order of whatever SATPS signal quality parameter $\kappa$ is used to determine this best set of satellites, then arrange the entries in the matrix $\Delta PR(t)$ for the remaining in-view satellites in decreasing order of the quality parameter $\kappa$. Another approach is to arrange the fundamental set of satellites as set forth in the first approach, then arrange the entries for the remaining in-view satellites in an increasing or decreasing sequence for the satellite number. Many alternative approaches can be used here. However, the reference station and the mobile station should agree on the quality parameter $\kappa$ or other criterion to be used for this ordering. This method can be implemented as illustrated in FIG. 2.

In step 41, the mobile station receives SATPS signals from M SATPS satellites j=1, . . . , M and determines the uncorrected spatial location and clock bias coordinates $(x,y,z,b)_{unc}$ for that station.

In step 43, the mobile station transmits its uncorrected coordinate values $(x,y,z,b)_{unc}$ to the SATPS reference station.

In step 45, the reference station receives the SATPS signals from the same M SATPS satellites and determines the M×1 pseudorange correction matrix $\Delta PR(t)$ for these measurements for the reference station, using the known reference station coordinates.

In step 47, the reference station receives the uncorrected coordinates $(x,y,z,b)_{unc}$ from the mobile station and forms the M×4 matrix H and the M×1 matrix $W(t)_{unc}{}^{tr}=[x\ y\ z\ b]_{unc}{}^{tr}$ in the space $S_H$.

In step 49, the reference station constructs the M×M extension $H^*(t)$ of the matrix $H(t)$ in the augmented space $S_{H*}$, and constructs the inverse matrix $H^*(t)^{-1}$. If M=4, $H^*(t)=H(t)$, and no augmentation of the space $S_H$ need be made.

In step 51, the reference station determines the M×1 coordinate value corrections matrix $\Delta W^*(t)$ for the mobile station, using Eq. (14), and the corrected location coordinates and clock bias for the mobile station according to Eq. (15).

In an optional step 53, the corrected coordinates $(x, y, z, b)_{cor}$ for the mobile station are transmitted to the mobile station, with a fixed total time delay $\Delta t(delay)$, so that the mobile station receives its corrected coordinates for an earlier time t' at a time t=t' +$\Delta t(delay)$.

The M×4 matrix H(t) can be generalized to an M×N matrix with $2 \leq N \leq M$ that relates M pseudorange values and other observables to N spatial and/or time coordinates. In this more general context, the N-dimensional space $S_H$ of M-dimensional vectors is embedded in, or expanded to, an M-dimensional space $S_{H*}$, using a Gram-Schmidt orthogonalization procedure or some other suitable procedure that produces M linearly independent vectors, beginning with the subspace $S_H$ of $S_{H*}$. Here, for example, one can choose: (1) N=2 for determination of two spatial coordinates; or (2) N=3 for determination of two spatial coordinates plus the clock bias; or N=3 for determination of three spatial coordinates.

Figure 3:
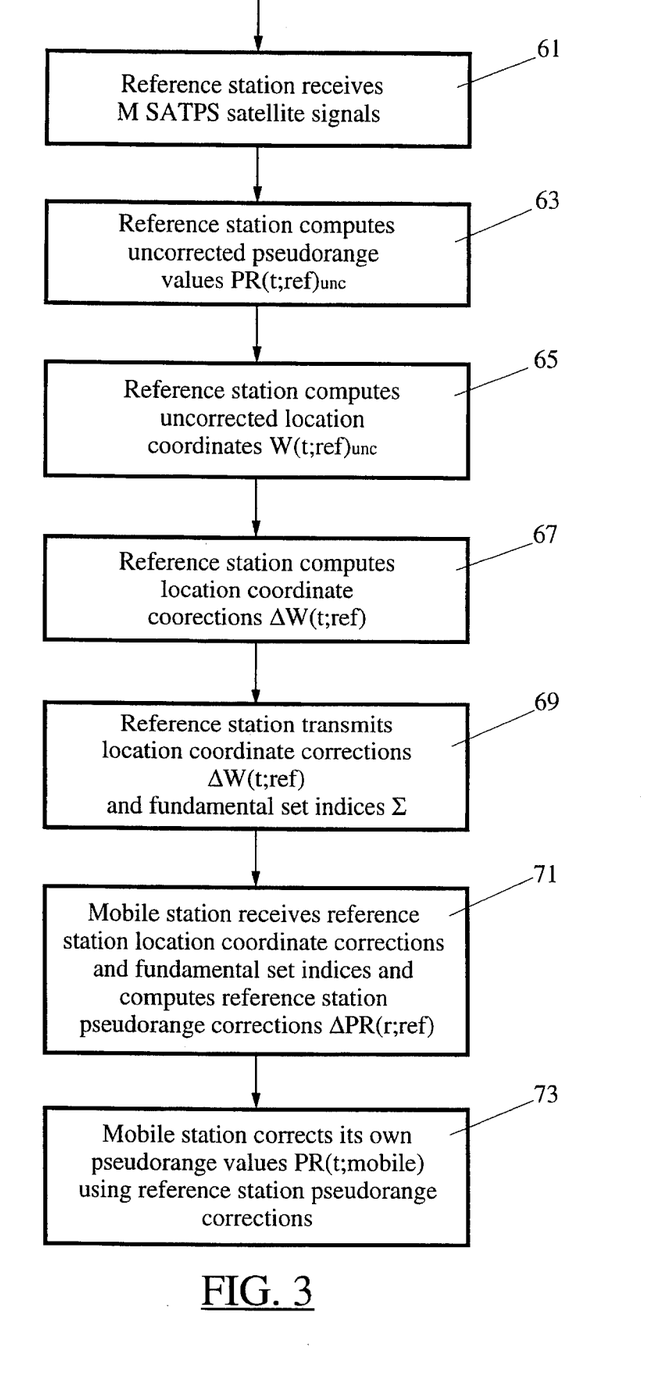

A variation of the preceding approach can be used to provide pseudorange corrections, computed at the reference station, for use by a mobile station that is spaced apart from the reference station. Equations (5)–(13) apply to the reference station values as well. The mobile station is assumed to have in memory the accurate spatial location coordinates $(x, y, z)_{ref}$ for the reference station. FIG. 3 illustrates, in flow chart form, the method used in this instance.

The reference station receives the SATPS signals in step 61, measures its uncorrected pseudorange values $PR(t;ref)_{unc}$ in step 63, computes the corresponding uncorrected coordinates $W(t;ref)_{unc}$ in step 65, and computes the coordinate corrections $\Delta W(t;ref)=[\Delta x\ \Delta y\ \Delta z\ \Delta b]_{ref}{}^{tr}$ by comparison of the uncorrected coordinates $W(t;ref)_{unc}$ with the known coordinates for the reference station in step 67. The reference station then transmits coordinate corrections $\Delta W(t;ref)$, for all visible satellites together with an index set $\Sigma$ indicating which SATPS satellites were used for the fundamental set, in step 69. In step 71, the mobile station receives the coordinate corrections $\Delta W(t;ref)$ and index set $\Sigma$ and determines the reference station pseudorange corrections $\Delta PR(t;ref)$, using Eq. (5) with the known matrix $H(t;ref)$. This improves the accuracy of the computed pseudorange corrections, as compared to using Eq. (5) with estimated mobile station coordinates for the matrix H. These pseudorange corrections are then used in step 73 to correct the pseudorange measurements (and location coordinates) for the mobile station.

In an alternative and preferred approach to the method illustrated in FIG. 2, construction of an augmented vector space $S_{H*}$ is not required. Using the matrix H=H(t;ref) computes an M×1 matrix or vector $$v(t)=[I-H(H^{tr}H)^{-1}H^{tr}]PR(t;mobile)=K\ (t;ref)\ PR(t;mobile), \quad (16)$$

where PR(t;mobile) is an M×1 matrix or vector whose entries are the pseudorange values measured at the mobile station. The M-vector v is a projection onto a subspace orthogonal to the space $S_H$tr, in the sense that $$H^{tr}v = H^{tr}K(t;ref)\ PR(t;mobile) = 0. \quad (17)$$

at the mobile station. Decompose v as a first vector component $v_f$ (of dimensions 4×1) and a second vector component $v_{nf}$ (of dimensions (M−4)×1, with M usually <8), viz.

$$v^{tr} = [v_f | v_{nf}]^{tr}. \quad (18)$$

Here, the first four entries in the vector v correspond to pseudorange signals from the four satellites in the "fundamental set," for which a selected quality parameter κ for each of these satellite signals is higher than the κ values for any of the other in-view satellites (in the "non-fundamental set"). The quality parameter κ may be chosen to be the geometrical dilution of precision (GDOP) for the configuration of these four satellites; or κ may be chosen on some other basis. The known matrix $H^{tr}$ is similarly divided into a 4×4 sub-matrix $H_f^{tr}$ and an (M−4)×4 sub-matrix $H_{nf}^{tr}$, in the following manner.

$$H^{tr} = [H_f^{tr} | H_{nf}^{tr}], \quad (19)$$

where the sub-matrix $H_f^{tr}$ has independent row vectors and is therefore invertible as a 4×4 matrix.

The fundamental set vector $v_f$ is then determinable from Eqs. (17) and (19) by the relation $$v_f = -(H_f^{tr})^{-1} H_{nf}^{tr} v_{nf}. \quad (20)$$

The entries in the (M−4)×1 matrix or vector $v_{nf}$ correspond to the pseudorange corrections for the non-fundamental set of SATPS satellites and are constructed from Eq. (16). The non-fundamental set $v_{nf}$ of pseudorange data plus the uncorrected coordinates $(x,y,z,b)_{unc}$ are transmitted by the mobile station to the reference station, together with a set Σ of indicia indicating which satelikes are included in the fundamental set and in the non-fundamental set. When the reference station receives the entries in the matrix $v_{nf}$, the matrices $H_{nf}^{tr}$ and $(H_f^{tr})^{-1}$ are constructed, using an estimate of the location coordinates of the mobile station, and the 4-vector $v_f$ is constructed from Eq. (20). The vector v can be used to construct parity vectors and other useful measures of accuracy. The mobile station uncorrected pseudorange values are constructed, using the received mobile station coordinates $(x,y,z,b)_{unc}$, and can be corrected using the reference station pseudorange corrections ΔPR(t;i=ref;j).

This approach does not require construction of an augmented vector space $S_{H^*}$ or construction of an inverse matrix $H^*(t)^{-1}$. The original 4×M matrix H(t) is divided into a 4×4 matrix $H_f$ and a 4×(M−4) matrix $H_{nf}$, an inverse matrix $(H_f^{tr})^{-1}$ is formed, the matrix $(H_f^{tr})^{-1} H_{nf}^{tr}$ is formed, and the fundamental set 4-vector $v_f$ is reconstructed at the reference station from the usually-fewer set of entries $v_{nf}$, using Eq. (20).

Figure 4:
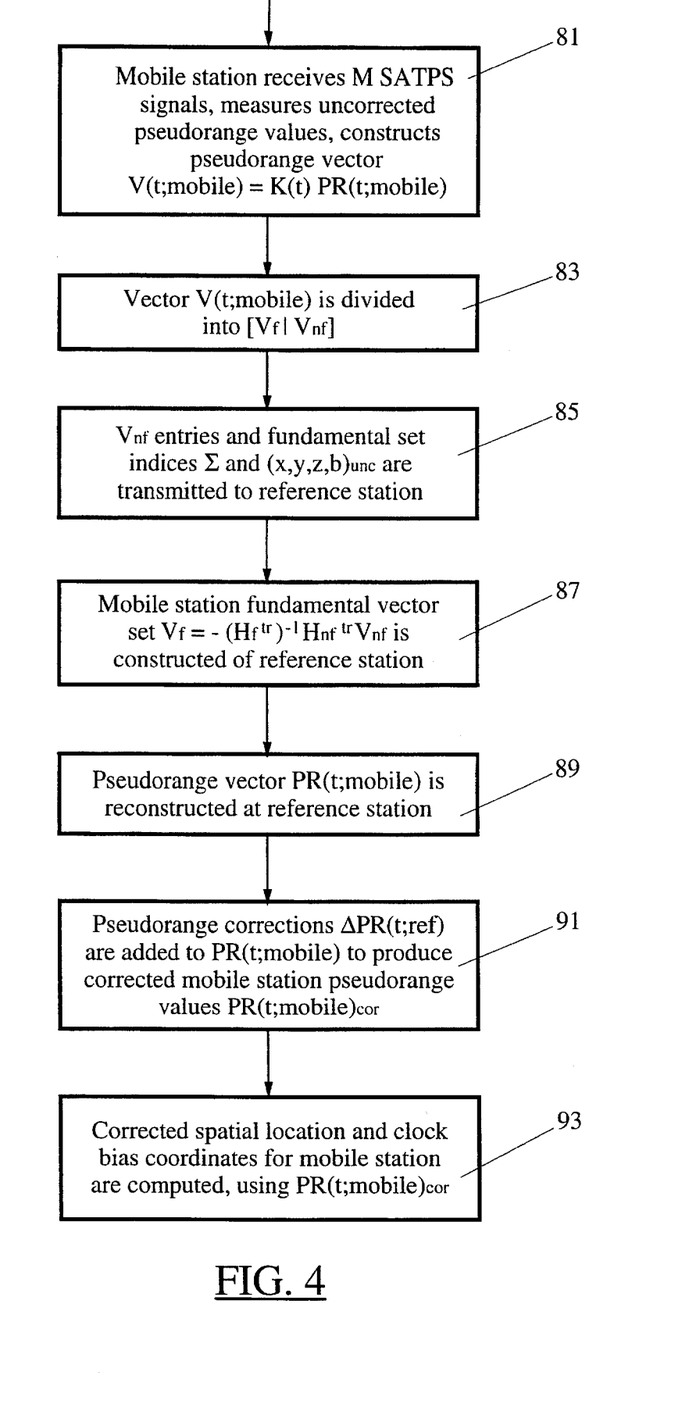

A suitable procedure for this alternative and preferred approach is illustrated in FIG. 4. In step 81, the vector v=K PR(t) is formed from the pseudorange values determined at the mobile station, using Eq. (16). In step 83, the vector v is divided into a fundamental set vector $v_f$ and a non-fundamental set vector $v_{nf}$. In step 85, the entries for the non-fundamental set vector $v_{nf}$ are transmitted to the reference station, along with the fundamental set indicia Σ. In step 87, the fundamental set vector $v_f$ is reconstructed using Eq. (20). The mobile station pseudorange values are reconstructed from the vector components of $v_f$ and/or $v_{nf}$, in step 89. The reference station receiver/processor then applies the pseudorange corrections to the mobile station fundamental set and determines the corrected spatial location and clock bias coordinates for that station, in steps 91 and 93.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto c f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 September 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k ($=0, 1, 2, \ldots, 23$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

I claim:

1. A method for determining spatial location and clock bias coordinates with enhanced accuracy for a mobile user Satellite Positioning System (SATPS) station, the method comprising the steps of:

providing an SATPS reference station, having location coordinates that are known with high accuracy, the reference station having an SATPS signal antenna and associated SATPS signal receiver/processor for receiving and processing SATPS signals from a plurality of SATPS satellites to determine spatial location and clock bias coordinates for that station;

providing an SATPS station that is mobile, having an SATPS signal antenna and associated SATPS signal receiver/processor for receiving and processing SATPS signals from a plurality of SATPS satellites to determine spatial location and clock bias coordinates for that station;

providing the mobile station with a radiowave transmitter and providing the reference station with a radiowave receiver so that the mobile station can transmit signals at a selected frequency that are received by the reference station;

causing each of the reference station and the mobile station to receive SATPS signals from a plurality of M SATPS satellites ($M \geq 4$) in common with each other, and to determine the pseudorange values $PR(t;i;j)$ as a function of time t for that station, numbered i (i=reference, i=mobile), from the signals received from the M common SATPS satellites, numbered $j=j1, j2, \ldots, jM$;

causing the reference station to determine pseudorange corrections $\Delta PR(t;i;j)$ that, when added to the pseudorange values $PR(t;i;j)$ measured at the reference station, produce spatial location and clock bias coordinates that agree with the known spatial location and clock bias coordinates for the reference station;

providing the mobile station with the spatial location and clock bias coordinates of a nominal solution of the pseudorange equations $$\{(x0(t)-x_j(t))^2+(y0(t)-y_j(t))^2+(z0(t)-z_j(t))^2\}^{1/2}+b0(t)=PR(t;i;j),$$

where (x0(t),y0(t),z0(t)) are the spatial location coordinates and b0(t) is the clock bias for this nominal solution, and ($x_j(t),y_j(t),z_j(t)$) are the location coordinates of satellite number j;

determining the spatial location and clock bias coordinates (x',y',z',b') for the mobile station from the SATPS signals received at that station;

forming a 4×1 matrix ΔW(t; mobile)={x'−x0 y'−y0 z'−z0 b'−b0}$^{tr}$, having matrix entries that are offset from the mobile station coordinates values (x',y',z',b') by the nominal solution coordinates values (x0,y0,z0,b0);

transmitting the entries of the matrix ΔW(t;mobile) to the reference station;

providing at the reference station an M×4 matrix H(t) whose entries are defined by the relations H(t)=($h_{ji}$(t)), $h_{j1}(t)=\alpha_{j1}(t)=(x0-x_j(t))/r_{0j}$, $h_{j2}(t)=\alpha_{j2}(t)=(y0-y_j(t))/r_{0j}$, $h_{j3}(t)=\alpha_{j3}(t)=(z0-z_j(t))/r_{0j}$, $h_{j4}(t)=1$, (j=1, 2, 3, . . . , M) , $r_{0j}(t)=\{(x0-x_j(t))^2+(y0-y_j(t))^2+(z0-z_j(t))^2\}^{1/2}$;

augmenting the matrix H(t) by adding M−4 columns of matrix entries to produce an augmented M×M matrix H*(t) for the reference station, where four columns of the matrix H*(t) are identical with four columns of the matrix H(t) and each of the columns of H*(t) forms an M×1 column matrix that is independent of the other M−1 column matrices of the matrix H*(t);

forming an inverse matrix H*(t)$^{-1}$, determining an M×1 matrix ΔW* by the matrix equation ΔW*(t)=H*(t)$^{-1}$ΔPR(t), where ΔPR(t) is an M×1 matrix whose entries are the values ΔPR(t;i;j) (j=1, 2, . . . , M) for the reference station;

interpreting four entries $w_1$*(t), $w_2$*(t), $w_3$*(t), and $w_4$*(t) of the matrix ΔW*(t) as corrections to the location coordinates and clock bias values (x',y',z',b') for the mobile station; and determining the corrected spatial location coordinates (x,y,z) and corrected clock bias b for the mobile station using the relations x(t)=x'(t)+$w_1$*(t), y(t)=y'(t)+$w_2$*(t), z(t)=z'(t)+$w_3$*(t), b(t)=b'(t)+$w_4$*(t).

2. The method of claim 1, further comprising the step of selecting said integer M=4.

3. The method of claim 1, further comprising the step of selecting said integer M≧5.

4. The method of claim 3, wherein the step of augmenting the matrix H(t) comprises the steps of:

forming an M-dimensional column vector from the values of said M entries in each of said four columns of said M×4 matrix H(t);

using the Gram-Schmidt orthogonalization procedure to form M−4 additional M-dimensional column vectors, with each such vector being orthogonal to each of the M-dimensional column vectors formed from said matrix H(t) and with these M−4 additional vectors being orthogonal to each other; and forming an augmented M×M matrix H*(t) matrix whose column entries are the entries of the four column vectors formed from the matrix H(t) and the entries of the additional M−4 column vectors formed using the Gram-Schmidt orthogonalization procedure.

5. A method for determining two-dimensional spatial location coordinates and clock bias with enhanced accuracy for a mobile user Satellite Positioning System (SATPS) station, the method comprising the steps of:

providing an SATPS reference station, having location coordinates that are known with high accuracy, the reference station having an SATPS signal antenna and associated SATPS signal receiver/processor for receiving and processing SATPS signals from a plurality of SATPS satellites to determine spatial location and clock bias coordinates for that station;

providing an SATPS station that is mobile, having an SATPS signal antenna and associated SATPS signal receiver/processor for receiving and processing SATPS signals from a plurality of SATPS satellites to determine spatial location and clock bias coordinates for that station;

providing the mobile station with a radiowave transmitter and providing the reference station with a radiowave receiver so that the mobile station can transmit signals at a selected frequency that are received by the reference station;

causing each of the reference station and the mobile station to receive SATPS signals from a plurality of M SATPS satellites (M≧3) in common with each other, and to determine the pseudorange values PR(t;i;j) as a function of time t for that station, numbered i (i=reference, i=mobile), from the signals received from the M common SATPS satellites numbered j=j1, j2, . . . , jM;

causing the reference station to determine pseudorange corrections ΔPR(t;i;j) that, when added to the pseudorange values PR(t;i;j) measured at the reference station, produce spatial location and clock bias coordinates that agree with the known spatial location and clock bias coordinates for the reference station;

providing the mobile station with the spatial location and clock bias coordinates of a nominal solution of the pseudorange equations $$\{(x0(t)-x_j(t))^2+(y0(t)-y_j(t))^2\}^{1/2}+b0(t)=PR(t;i;j),$$

where (x0(t),y0(t)) are the spatial location coordinates and b0(t) is the clock bias for this nominal solution, and (xj(t), yj(t)) are the location coordinates of satellite number j;

determining the spatial location and clock bias coordinates (x',y',b') for the mobile station from the SATPS signals received at that station;

forming a 3×1 matrix ΔW(t; mobile)={x'−x0 y'−y0 b'−b0}$^{tr}$, having matrix entries that are offset from the mobile station coordinates values (x',y',b') by the nominal solution coordinates values (x0,y0,b0);

transmitting the entries of the matrix ΔW(t;mobile) to the reference station;

providing at the reference station an M×3 matrix H(t) whose entries are defined by the relations H(t)=($h_{ji}$(t)), $h_{j1}(t)=\alpha_{j1}(t)=(x0-x_j(t))/r_{0j}$, $h_{j2}(t)=\alpha_{j2}(t)=(y0-y_j(t))/r_{0j}$, $h_{j3}(t)=1$, (j=1, 2, 3, . . . , M) , $r_{0j}(t)=\{(x0-x_j(t))^2+(y0-y_j(t))^2\}^{1/2};$ augmenting the matrix H(t) by adding M−3 rows of matrix entries to produce an augmented M×M matrix H*(t) for the reference station, where three columns of the matrix H*(t) are identical with three columns of the matrix H(t) and each of the columns of H*(t) forms a 1×M column matrix that is independent of the other M−1 column matrices of the matrix H*(t);

forming an inverse matrix H*(t)$^{-1}$, determining an M×1 matrix ΔW* by the matrix equation ΔW*(t)=H*(t)$^{-1}$ΔPR(t), where ΔPR(t) is an M×1 matrix whose entries are the values ΔPR(t;i;j) (j=1, 2, . . . , M) for the reference station;

interpreting three entries $w_1$*(t), $w_2$*(t) and $w_3$*(t) of the matrix ΔW*(t) as corrections to the location coordinates and clock bias values (x',y',b') for the mobile station; and determining the corrected location coordinates (x,y) and corrected clock bias coordinate b for the mobile station using the relations $x(t)=x'(t)+w_1$*(t), $y(t)=y'(t)+w_2$*(t), $b(t)=b'(t)+w_3$*(t).

6. The method of claim 5, further comprising the step of selecting said integer M=3.

7. The method of claim 5, further comprising the step of selecting said integer M≧4.

8. The method of claim 7, wherein the step of augmenting the matrix H(t) comprises the steps of:

forming an M-dimensional vector from the values of said M entries in each of said three columns of said M×3 matrix H(t);

using the Gram-Schmidt orthogonalization procedure to form M−3 additional M-dimensional column vectors, with each such vector being orthogonal to each of the M-dimensional vectors formed from said matrix H(t) and with these M−3 additional vectors being orthogonal to each other; and forming an augmented M×M matrix H*(t) matrix whose column entries are the entries of the three column vectors formed from the matrix H(t) and the entries of the additional M−3 column vectors formed using the Gram-Schmidt orthogonalization procedure.

9. A method for determining spatial location coordinates with enhanced accuracy for a mobile user Satellite Positioning System (SATPS) station, the method comprising the steps of:

providing an SATPS reference station, having location coordinates that are known with high accuracy, the reference station having an SATPS signal antenna and associated SATPS signal receiver/processor for receiving and processing SATPS signals from a plurality of SATPS satellites to determine spatial location and clock bias coordinates for that station;

providing an SATPS station that is mobile, having an SATPS signal antenna and associated SATPS signal receiver/processor for receiving and processing SATPS signals from a plurality of SATPS satellites to determine spatial location and clock bias coordinates for that station;

providing the mobile station with a radiowave transmitter and providing the reference station with a radiowave receiver so that the mobile station can transmit signals at a selected frequency that are received by the reference station;

causing each of the reference station and the mobile station to receive SATPS signals from a plurality of M SATPS satellites (M≧3) in common with each other, and to determine the pseudorange values PR(t;i;j) as a function of time t for that station, numbered i (i=reference, i=mobile), from the signals received from the M common SATPS satellites numbered j=j1, j2, . . . , jM;

causing the reference station to determine pseudorange corrections ΔPR(t;i;j) that, when added to the pseudorange values PR(t;i;j) measured at the reference station, produce spatial location and clock bias coordinates that agree with the known spatial location and clock bias coordinates for the reference station;

providing the mobile station with the spatial location and clock bias coordinates of a nominal solution of the pseudorange equations $$\{(x0(t)-x_j(t))^2+(y0(t)-y_j(t))^2+(z0(t)-z_j(t))^2\}^{1/2}=PR(t;i;j),$$

where (x0(t),y0(t),z0(t)) are the spatial location coordinates for this nominal solution, and ($x_j(t),y_j(t),z_j(t)$) are the location coordinates of satellite number j;

determining the spatial location coordinates (x',y',z') for the mobile station from the SATPS signals received at that station;

forming a 3×1 matrix ΔW(t; mobile)={x'−x0 y'−y0 z'−z0}$^{tr}$, having matrix entries that are offset from the mobile station coordinates values (x',y',z') by the nominal solution coordinates values (x0,y0,z0);

transmitting the entries of the matrix ΔW(t;mobile) to the reference station;

providing at the reference station an M×3 matrix H(t) whose entries are defined by the relations $H(t)=(h_{ji}(t))$, $h_{j1}(t)=α_{j1}(t)=(x0-x_j(t))/r_{0j}$, $h_{j2}(t)=α_{j2}(t)=(y0-y_j(t))/r_{0j}$, $h_{j3}(t)=α_{j3}(t)=(z0-z_j(t))/r_{0j}$, $r_{0j}(t)=\{(x0-x_j(t))^2+(y0-y_j(t))^2+(z0-zj(t))^2\}^{1/2};$ augmenting the matrix H(t) by adding M−3 columns of matrix entries to produce an augmented M×M matrix H*(t) for the reference station, where three columns of the matrix H*(t) are identical with three columns of the matrix H(t) and each of the columns of H*(t) forms an M×1 column matrix that is independent of the other M×1 column matrices of the matrix H*(t);

forming an inverse matrix H*(t)$^{-1}$, determining an M×1 matrix ΔW* by the matrix equation ΔW*(t)=H*(t)$^{-1}$ΔPR(t), where ΔPR(t) is an M×1 matrix whose entries are the values ΔPR(t;i;j) (j=1, 2, . . . , M) for the reference station;

interpreting three entries $w_1$*(t), $w_2$*(t) and $w_3$*(t) of the matrix ΔW*(t) as corrections to the location coordinates (x',y',z') for the :mobile station; and determining the corrected location coordinates (x,y,z) for the mobile station using the relations $x(t)=x'(t)+w_1$*(t), $y(t)=y'(t)+w_2$*(t), $z(t)=z'(t)+w_3$*(t).

10. The method of claim 9, further comprising the step of selecting said integer M=3.

11. The method of claim 9, further comprising the step of selecting said integer M≧4.

12. The method of claim 11, wherein the step of augmenting the matrix H(t) comprises the steps of:

forming an M-dimensional vector from the values of said M entries in each of said three columns of said M×3 matrix H(t);

using the Gram-Schmidt orthogonalization procedure to form M-3 additional M-dimensional column vectors, with each such vector being orthogonal to each of the M-dimensional column vectors formed from said matrix H(t) and with these M-3 additional column vectors being orthogonal to each other; and forming an augmented M×M matrix H*(t) matrix whose column entries are the entries of the three column vectors formed from the matrix H(t) and the entries of the additional M−3 column vectors formed using the Gram-Schmidt orthogonalization procedure.

13. A method for determining spatial location and clock bias coordinates with enhanced accuracy for a mobile user Satellite Positioning System (SATPS) station, the method comprising the steps of:

providing an SATPS reference station, having location coordinates that are known with high accuracy, the reference station having an SATPS signal antenna and associated SATPS signal receiver/processor for receiving and processing SATPS signals from a plurality of SATPS satellites to determine spatial location and clock bias coordinates for that station;

providing an SATPS station that is mobile, having an SATPS signal antenna and associated SATPS signal receiver/processor for receiving and processing SATPS signals from a plurality of SATPS satellites to determine spatial location and clock bias coordinates for that station;

providing the mobile station with a radiowave transmitter and providing the reference station with a radiowave receiver so that the mobile station can transmit signals at a selected frequency that are received by the reference station;

causing each of the reference station and the mobile station to receive SATPS signals from a plurality of M SATPS satellites (M≥5) in common with each other, and to determine the pseudorange values PR(t;i;j) as a function of time t for that station, numbered i (i=reference, or i=mobile), from the signals received from the M common SATPS satellites, numbered j=j1, j2, . . . , jM, where the satellites j=j1, j2, j3, j4 form a fundamental set of SATPS satellites used for determination of the location of the mobile station;

determining spatial location and clock bias coordinates (x',y',z',b') for the mobile station from the SATPS signals received at that station;

causing the reference station to determine pseudorange corrections ΔPR(t;ref;j) that, when added to the pseudorange values PR(t;ref;j) measured at the reference station, produce spatial location and clock bias coordinates that agree with the known spatial location and clock bias coordinates for the reference station;

providing at the reference and mobile stations an M×4 matrix H(t;ref), determined from the reference station location coordinates, whose entries are defined by the relations $H(t;ref)=(h_{ji}(t))$, $h_{j1}(t)=\alpha_{j1}(t)=(x0-x_j(t))/r_{0j}$, $h_{j2}(t)=\alpha_{j2}(t)=(y0-y_j(t))/r_{0j}$, $h_{j3}(t)=\alpha_{j3}(t)=(z0-z_j(t))/r_{0j}$, $h_{j4}(t)=1$, (j=1, 2, 3, . . . , M), $r_{0j}(t)=\{(x0-x_j(t))^2+(y0-y_j(t))^2+(z0-z_j(t))^2\}^{1/2}$;

decomposing the matrix H(t;ref) into a 4×4 matrix $H_f=(h_{ji})_f$ (j=j1, j2, j3, j4) and an (M−4)×4 matrix $H_{nf}=(h_{ji})_{nf}$ (j=j5, . . . , jM);

forming an M×1 matrix $v=\{I-H(H^{tr}H)^{-1}H^{tr}\}$ PR(t;mobile) at the mobile station, where PR(t;mobile) is an M×1 vector whose ordered entries are the pseudorange values PR(t;mobile;j) (j=j1, j2, . . . , jM);

decomposing the matrix v into a 4×1 column matrix $v_f$, consisting of the first four entries of the matrix v, and an (M−4)×1 column matrix $v_{nf}$, consisting of the last M−4 entries of the matrix v;

transmitting the M−4 entries of the matrix $v_{nf}$ and the mobile station coordinates (x',y',z',b') to the reference station;

constructing at the reference station the matrix $v_f$ by the relation $v_f=-(H_f^{tr})^{-1}H_{nf}^{tr}v_{nf}$;

reconstructing the vector $v=\{v_f|v_{nf}\}^{tr}$ at the reference station as a concatenation of the vectors $v_f$ and $v_{nf}$;

reconstructing the matrix of pseudorange values PR(t;mobile) from the vector v at the reference station;

adding the pseudorange corrections ΔPR(t;ref;j) to the pseudorange values PR(t;mobile;j) for the fundamental set (j=j1, j2, j3, j4) to form corrected pseudorange values PR(t;mobile;j)$_{cor}$ for the fundamental set; and determining corrected spatial location and clock bias coordinates for the mobile station, using the corrected pseudorange values PR(t;mobile;j)$_{cor}$ for the fundamental set.

* * * * *